United States Patent [19]

Umeda

[11] 3,820,140

[45] June 25, 1974

[54] AUTOMATIC FILM WINDING AND SHUTTER COCKING MECHANISM

[75] Inventor: Kaoru Umeda, Osaka, Japan

[73] Assignee: Minolta Camera Kabushiki Kaisha, Osaka-shi, Osaka-fu, Japan

[22] Filed: Oct. 27, 1972

[21] Appl. No.: 301,512

[30] Foreign Application Priority Data

Oct. 30, 1971    Japan ........................ 46-100495
Nov. 25, 1971    Japan .......................... 46-94085

[52] U.S. Cl. ........................................... 354/171
[51] Int. Cl. .......................................... G03b 19/04
[58] Field of Search .......... 95/31 EL, 31 FL, 31 AC

[56] References Cited
UNITED STATES PATENTS

| | | | |
|---|---|---|---|
| 3,064,522 | 11/1962 | Fukuoka | 95/31 EL |
| 3,598,034 | 8/1971 | Suzuki | 95/31 AC |
| 3,640,201 | 2/1972 | Kimura | 95/31 EL |

*Primary Examiner*—John M. Horan
*Attorney, Agent, or Firm*—Watson, Cole, Grindle & Watson

[57] ABSTRACT

An electric motor effects the winding of a film and the cocking of a shutter. A film winding control mechanism comprises a cam operated in accordance with the load exerted on a film winding shaft whereby the cam operates with the winding load exceeding a predetermined value and ceases operation with the winding load below said predetermined value after completion of both the cocking of the shutter and the winding of the film. A detecting lever is mounted to be positioned within the travel path of a shutter release controlling member during the period from the initiation of film winding until the completion of the film winding and is retracted from that travel path during the time from completion of the film winding until completion of exposure. When the winding of the entire film has been completed prior to the cocking of the shutter, the cam is actuated by the increased load on the film winding shaft whereby the detecting lever is actuated by movement of the release controlling shaft resulting from movement of the cam. The drive of the motor or the rewinding of the film by the drive motor is thereby automatically accomplished.

14 Claims, 17 Drawing Figures

AUTOMATIC FILM WINDING AND SHUTTER COCKING MECHANISM

BACKGROUND OF THE INVENTION

Field of the Invention

This invention relates to a motor-driven photographic camera wherein the film winding and the cocking of a shutter are effected by means of an electric motor, and more particularly to a motor driven photographic camera wherein when the winding or transfer of the entire film has been completed in the course of the film winding operation, the winding of the film may automatically be stopped.

Many devices have been proposed, wherein the winding of one frame of a film and the cocking of a shutter are effected by an electric motor and wherein after the completion thereof, the shutter is released for photographing. Furthermore, other devices and mechanisms are known wherein the motor-driven film winding operation may be stopped upon completion of the winding of the entire film.

Among such devices, there is one type relating to a 36 frame film wherein a film counter issues a signal upon completion of the photographing of 36 frames of the film, thereby automatically stopping the winding of the film. In another type there is provided a switch actuated by the movement of a film cartridge by tension created between the film cartridge and a sprocket so that the winding of the film may be stopped. A further type uses a set of rotating members to create relative off-phase rotation between a motor and a sprocket, such that the aforesaid off-phasing is created only when the transfer of the entire film has been completed, thereby resulting in the exertion of tension on the film, and thus the switch is released to automatically stop the winding operation of the film.

However, these known devices have suffered from the following disadvantages. In the first type, every time a camera is charged with a film, a counter should be adjusted to the number of film frames, and furthermore, a film transfer means will not be satisfactorily operated, if the film counter is not set in operation once a proper length of the film has been wound around a film winding shaft and if the entire film has been transferred prior to the photographing of the intended number of frames. In the second and third steps, when rewinding a film, there is resistive, difficult, or even impossible rewinding of the film, because the mechanism from a motor to a sprocket will be maintained in tension created between a film and the film cartridge.

The present invention avoids such drawbacks by providing an improved film winding mechanism for a motor driven photographic camera having the following characteristic features. A cam operated when the winding load for the film becomes greater than a predetermined value and thus a release controlling shaft is operated thereby. A detecting lever having one arm movable to a position within the travel range of the release controlling shaft during the period from the commencement of winding one frame of the film until the completion thereof and retracted from that position upon completion of film winding and maintained in the retracted position until the completion of exposure. Thus, when the transfer of the entire film has been completed in the course of winding of one frame of the film and thus the load is additionally applied to the film winding operation, then the cam will actuate the release controlling shaft and the detecting member or lever will automatically detect the actuation thus initiated, with the result that the motor driven film winding is stopped or the film rewinding is effected.

THE OBJECTS OF THE INVENTION

Accordingly, it is an object of the invention to provide a film winding mechanism for a motor driven photographic camera which is capable of automatically stopping the film winding operation by means of the drive of a motor without exerting an excessive tension on a film, upon completion of winding the entire film.

It is another object of the invention to provide a film winding mechanism for a motor driven photographic camera which enables the automatic and instant stopping of the film winding operation without creating an excessive film tension upon completion of winding the entire film.

It is a further object of the invention to provide a film winding mechanism for a motor driven photographic camera which effects automatic stopping of the motor driven film winding operation and which thereafter effects automatic rewinding of the film without exerting an excessive tension on the film, upon completion of winding the entire film.

It is a still further object of the present invention to provide a film winding mechanism for a motor driven photographic camera which effects automatic stopping of the motor driven film winding operation when the winding of the entire film has been completed and which can maintain an idle condition for winding the film subsequent to the release of the tension from the film, which tension has been caused due to the winding operation, thereby enabling the smooth rewinding of the film.

It is a yet further object of the invention to provide a film winding mechanism for a photographic camera which permits automatic stopping of motor driven film winding upon completion of winding the entire film, regardless of the length of a leading portion of the film to be wound around a film winding shaft at the time of loading a camera with the film.

These and other objects of the present invention will be apparent from the following description taken with reference to the accompanying drawings.

SUMMARY OF THE INVENTION

According to the present invention, there is provided a film winding mechanism for a photographic camera which comprises the following mechanism. A cam remains still when the load required for the cocking of a shutter and for winding a film is exerted on the film winding mechanism by means of a drive motor and which is moved by the motor when a load in excess of that load is being applied. A first switching member is operated by the cam to effect the switching and the release operation. A shutter release controlling member is operated by the switching member; and a detecting member cooperates with the camera mechanism and positioned within the travel range of the release controlling member during the period from the commencement of winding one frame of a film until the completion of winding thereof. The shutter release controlling member moves to a retracted position from an engaging position upon completion of the film winding and shutter cocking operations and remains in the retracted position until the completion of exposure. Thereby, the cam will actuate the release controlling member when the aforesaid excessive load is supplied to the film winding mechanism upon completion of the transfer of the entire film but in the course of winding one frame of the film, whereupon the detecting member detects the aforesaid operation to automatically stop the drive motor winding of the film.

BRIEF DESCRIPTION OF THE DRAWINGS

FIGS. 5 through 8 show a motor drive circuit used in the above embodiment of FIG. 1, in which

FIGS. 10A – 10C are top views of portions of the second embodiment of the invention, showing the constructional relationship of a detecting member of the camera mechanism, in which

DETAILED DESCRIPTION OF THE INVENTION

One embodiment of the invention will now be described with reference to FIGS. 1 through 8.

Figures 1, 2, 3, 4:
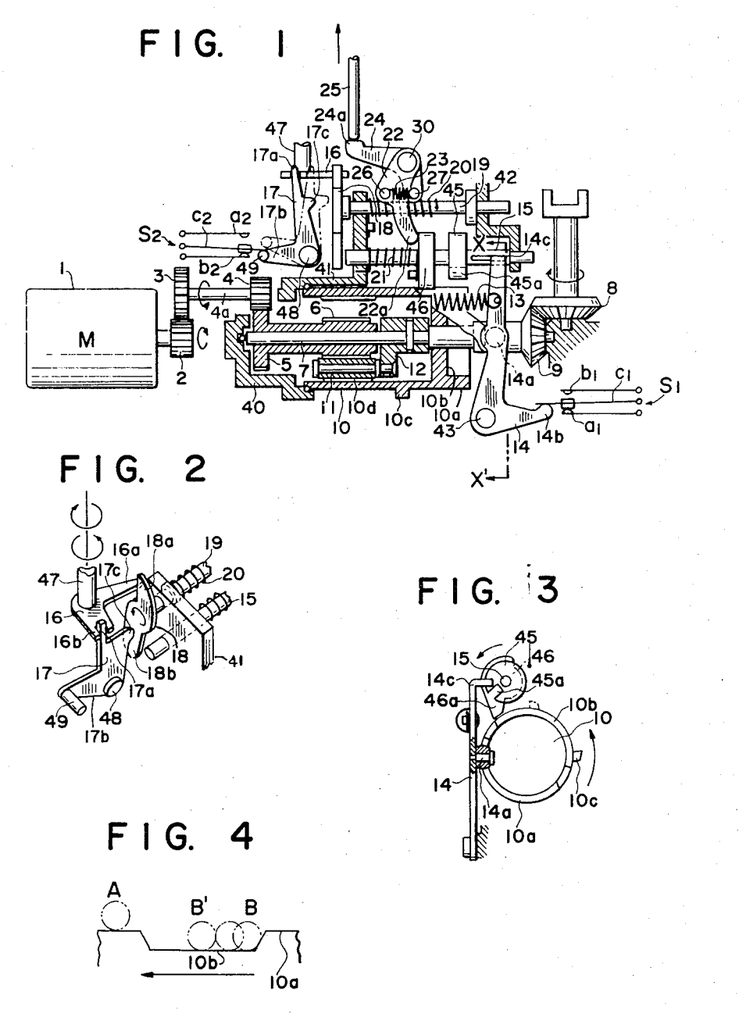
FIG. 1 is a cross-sectional view, partly in side elevation, of the essential parts of the first embodiment of the invention.
FIG. 2 is a perspective view of part of the construction of a detecting member of the embodiment shown in FIG. 1.
FIG. 3 is a plan view of essential parts of the embodiment shown in FIG. 1.
FIG. 4 illustrates the operational relationship of the cam shown in FIG. 1 and a pin on the first switching lever.

In FIG. 1, there is shown gear 3 meshing with gear 2 secured to rotating shaft 4a of motor 1. Gear 3 is integrally secured onto shaft 4a in coaxial relation to gear 4. Gear 5 meshing with gear 4 is integral with sun gear 6 which is part of a differential gear mechanism which will be described in more detail hereinafter. Shaft 7 is loosely journaled in both gears 5 and 6 and rigidly mounts on its right end bevel gear 9 meshing with gear 8 which is operably associated with the frame winding operation and is journaled in its center portion in a bracket 12 which supports therein an epicyclic gear 11 meshing with an inner gear 10d of cylindrical cam 10. Gear 11 forms the differential gear mechanism in conjunction with sun gear 6.

Cylindrical cam 10 is journaled at its left end in known means such as ball bearings mounted on body brackets 40 and 41 and has at its right end a side wall, through which extends shaft 7, so as to smoothly rotate about shaft 7. The right end face of cylindrical cam 10 is formed with projection 10a and recess 10b as shown in FIG. 4. Roller 14a is urged against the surface of cam 10, being mounted on first switching lever 14. Protruding from and integral with the outer peripheral surface of cylindrical cam 10 is projecting element 10c engaging plate cam 46 mounted rigidly on release controlling shaft 15 which will be described hereinafter.

First switching lever 14 is rotatably mounted on shaft 43, which in turn is rigidly mounted on the camera body. Interposed between the longer arm of lever 14 and a portion of a body (not shown) is spring 13 which tends to rotate lever 14 in a counterclockwise direction, whereby roller 14a mounted on the lever 14 is urged against the cam surface formed on the right end of the cylindrical cam 10. Further, a first contact 14b is in engagement with movable contacting piece c1 of first switch S1.

Switch S1 is so designed that movable contact c1 contacts terminal a1 when roller 14a on first switching lever 14 is in engagement with projection 10a on the cam surface of cylindrical cam 10. Thereby, first contacting element 14b is rotated in a counterclockwise direction, and movable contact c1 contacts terminal b1 when roller 14a is in engagement with recess 10b on the cam surface. The drive circuit associated therewith will be described with reference to FIG. 5.

Second contacting element 14c provided on the tip of the longer arm of switching lever 14 abuts flange portion 45 mounted rigidly on release controlling shaft 15, such that element 14c will abut flange portion 45 when roller 14a is in engagement with recess 10b formed in the cam surface to thereby urge shaft 15 to the left. Conversely, when release controlling shaft 15 rotates a small extent, second contacting element 14c will fit in groove 45a formed in the flange portion 45, thereby allowing shaft 15 to return to its normal position under the action of spring 21.

Release controlling shaft 15 is rotatably and slidably journaled at its opposite ends in brackets 41 and 42 and is so designed to be biased to the left by means of counterclockwise rotation of first switching lever 14. Release controlling shaft 15 further mounts in its center portion plate cam 46, the side of which is adapted to abut lower end 22a of cooperating lever 22 as more fully described hereinafter. Interposed between plate cam 46 and body bracket 41 is spring 21 which normally maintains release controlling shaft 15 in the position as shown and tends to rotate shaft 15 in a counterclockwise direction as viewed in FIG. 3. Lower end 46a of plate cam 46 is so designed to slidingly contact the outer periphery of cylindrical cam 10.

Lever 16 is rigidly secured on shaft 47 and rotates in conjunction with shaft 47 by means of a signal from the camera in such a manner that, upon completion of the winding operation, it rotates in a clockwise direction as shown in FIG. 2; whereas lever 16 rotates in a counterclockwise direction upon completion of the transfer of the rear curtain. The detailed construction of this arrangement is identical to that of the second embodiment shown in FIG. 10A – 10C.

As clearly shown in FIG. 2, lever 16 is formed with an arm 16a and bifurcated arm 16b, arm 16a engaging one arm 18a of detecting lever 18 as described hereinafter, and arm 16b engaging the tip of one arm 17a of second switching lever 17. Second switching lever 17 is pivoted on shaft 48 which in turn is journaled in a body bracket, while pin 49 projecting from arm 17b engages movable contact c2 of second switch S2. When second switching lever 17 is rotated in a counterclockwise direction to move pin 49 to the position as shown, then movable contact c2 of second switch S2 contacts terminal b2. Conversely, when switching lever 17 is rotated in clockwise direction to move to the position shown by the chain line, then movable contact c2 contacts terminal a2. Additionally, right-hand projection 17c is capable of abutting the left side of detecting lever 18.

Detecting lever 18 is integral with shaft 19 which is journaled at its opposite ends in body brackets 41 and 42 and tends to rotate detecting lever 18 in a counterclockwise direction as shown in FIG. 2 under the action of spring 20 which is wound around shaft 19 and anchored both to shaft 19 and bracket 41, while urging the shaft 19 to the right as viewed in FIG. 1. As shown in FIG. 2, since lever 16 remains in a clockwise rotated position during the period from the completion of film winding operation immediately prior to the completion of the transfer of the rear curtain, the arm 18b of detecting lever 18 is retracted from the path of travel of release controlling shaft 15. Moreover, since lever 16 remains in the position in which it has been rotated in a counterclockwise direction during the period from the completion of the transfer of the rear curtain immediately prior to the winding of the film, arm 18b is in the travel path of release controlling shaft 15.

With reference to FIG. 1, the lever 22 is pivotally mounted on shaft 30 secured at its upper end to the body of the camera, and release lever 24 is also pivotally mounted on shaft 30. Pin 26 projecting from and located in the center of lever 22 is connected by spring 23 with pin 27 projecting from and located on the arm extending downwardly from release lever 24. Arm 24a extends sidewardly of release lever 24 and is in such a position in FIG. 1 so as to abut rod 25 to release the shutter when the lever 24 is rotated upwardly.

Figure 5:
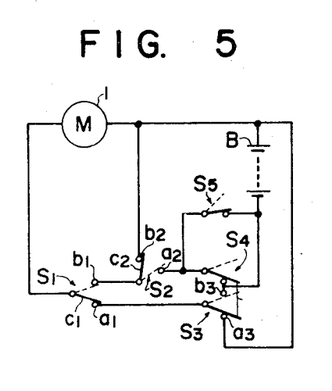
FIG. 5 illustrates the motor drive circuit prior to the shutter releasing operation in continous one-frame photographing.

FIGS. 5 through 8 illustrate a motor drive circuit for use in the embodiments of the present invention. The reference symbols S1 and S2 correspond to first switch S1 and second switch S2 of FIG. 1, respectively, and the solid lines represent the position of the switch elements shown in FIG. 1. Reference symbols S3 and S4 represent switches actuated in conjunction with and by means of release buttons not shown. The solid lines of FIG. 5 represent the condition in which the release buttons have not been manipulated, while the broken lines represent the condition in which the release buttons have been manipulated. Symbol S5 denotes a switch for use in switching from one-frame photographing to continuous photographing. The solid lines (ON) of FIG. 5 show the position for continuous photographing, while the broken lines (OFF) of FIG. 5 denote one-frame photographing. The symbol B designates an electric power source such as a battery. Switch S5 can be manually manipulated from outside of the body of the camera. Symbol M represents motor 1 of FIG. 1.

The operation of the previously disclosed mechanism is as follows. For continuous one-frame photographing operation, switch S5 is thrown so as to provide the (ON) condition shown by the solid lines in FIG. 5. The release button is actuated, i.e., the switches S3, S4 are brought into the positions as shown in broken lines in FIG. 5.

Figure 6:
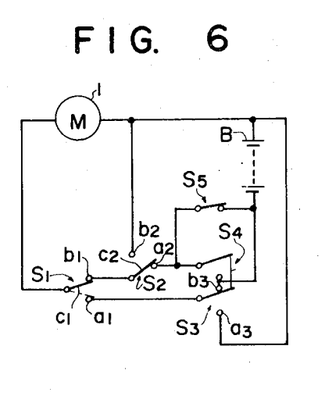
FIG. 6 is the motor drive circuit during the course of film winding operation in continous one-frame photographing.

In the course of the film winding operation, roller 14a of first switching lever 14 is in position B in recess 10b of the cam surface of cylindrical cam 10 as shown in FIG. 4. The movable contacting piece c1 of first switch S1 is in contact with terminal b1, since roller 14a is in recess 10b. Since the winding is in process, lever 16 is rotated in a counterclockwise direction and hence second switching lever 17 is in the position shown by the chain line, while movable contacting piece C2 of second switch S2 is in contact with terminal a2. The motor drive circuit is completed as shown in FIG. 6 and a load on the winding side is smaller than that which is exerted under the action of spring 13 onto the cam surface of the cylindrical cam 10, such that the rotation of the motor is transmitted in turn through gear 2 — gear 3 — gear 4 — gear 5 — gear 6 — gear 11, eventually to shaft 7 which will be rotated thereby so as to rotate bevel gears 9 and 8, thus accomplishing the film winding operation. (FIG. 1).

When the winding operation has been completed and the load being applied on the film winding system is greater, i.e., the relation of the loads has been reversed, the winding operation will be stopped and then cylindrical cam 10 will overcome the load which has been applied thereto beforehand and thus rotate, so that roller 14a will ride on projection 10a instead of recess 10b. Accordingly, spring 13 will be compressed, while first switching lever 14 will be rotated in a clockwise direction, thus causing movable contact c1 of first switch S1, which has been in engagement with first contacting element 14a to contact terminal a. (See broken lines in FIG. 6).

Thus, the winding operation of the motor drive mechanism will be completed, whereupon lever 16 will be rotated in a clockwise direction and then second switching lever 17 engaged therewith will be rotated in a counterclockwise direction with the result that movable contact C2 of second switch S2 will be brought into contact with terminal b2. However, it should be noted that since switch S3 is in contact with terminal b3 as shown in FIG. 6, and thus the motor drive circuit has been completed, motor 1 will continue to operate even upon completion of the film winding operation.

Because of the greater load being applied on the winding side, cylindrical cam 10 will remain rotating and thus roller 14a will engage recess 10b. Then, second contacting element 14c of first switching lever 14 will abut the flange portion 45 of release controlling shaft 15 to thereby urge shaft 15 to the left, such that plate cam 46 rigidly mounted on the surface 15 and lever 22, the lower end 22a of which abuts plate cam 46, are rotated in a clockwise direction, while release lever 24 connected by a spring thereto rotates in a clockwise direction. Then arm 24a will upwardly urge rod 25 in engagement therewith to thereby effect the shutter release. At the same time, the counterclockwise rotation of release controlling shaft 15 will move switch S1 to contact between contact c1 and contact b1 and then motor 1 will be short-circuited and stopped abruptly. Upon completion of the transfer of the rear curtain, lever 16 will be rotated in a clockwise direction, thus making contact of switch S2 between contact C2 and contact a2 via the second switching lever 17. As can be seen from FIG. 3, this causes cylindrical cam 10 to further rotate, thereby causing projection 10c on the outer periphery of cylindrical cam 10 to abut lower end 46a of plate cam 46. This leads to the clockwise rotation of plate cam 46 and the flange portion 45 by the action of spring 21 as shown in FIG. 3, such that second contacting element 14c will fit in groove 45a. Accordingly, release controlling shaft 15 will be released. As a result, shaft 15 will return to its normal position under the action of spring 21, while both lever 22 in engagement therewith and release lever 24 will return to their respective normal positions, causing rod 25 to be lowered to its original position.

Thus, upon completion of film winding, switch S1 will be connected between contact c1 and contact a1, thus repeating the aforesaid operations to thereby effect continuous photographing without interruption, as long as the release button is being depressed.

In the case of one-frame photographing the operation is as follows. Switch S5 for continuous one-frame photographing is thrown to the broken line (OFF) position shown in FIG. 5. The release button is not manipulated, i.e., the third and fourth switches S3, S4 remain in their respective solid line positions.

Figure 7:
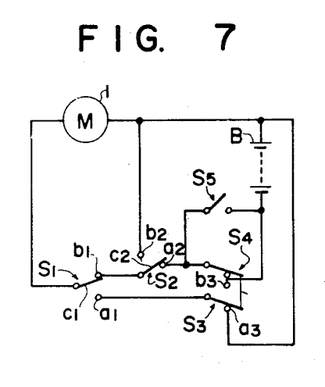
FIG. 7 is the motor drive circuit during the course of winding a film in one-frame photographing.

As with continuous photographing, when the film winding is in process, roller 14a rests on recess 10b in a position B as shown in FIG. 4. In other words, the relation of first switch S1 to second switch S2 is similar to that in the case of continuous photographing. The motor drive circuit used is as shown in FIG. 7.

Figure 8:
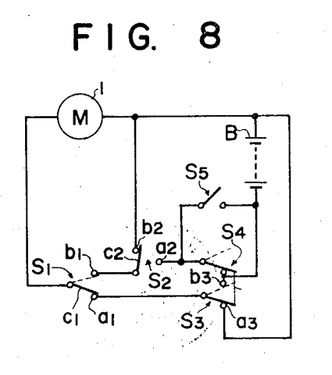
FIG. 8 is the motor drive circuit during the shutter releasing operation in one-frame photographing.

Upon completion of the film winding operation, roller 14a will ride on the projection 10a, and then movable contact c1 of switch S1 will be brought into contact with terminal a1, such that, as is clear from FIG. 8, the short-circuiting of the motor 1 will be completed, thereby braking motor 1 to cause roller 14a to make a sudden stop in the position A (FIG. 4).

Subsequently, when the release button is manipulated, the movable contact of third switch S3 will be brought into contact with terminal b3, while switch S4 will be disconnected from terminal b3. This causes motor 1 to be driven, thereby rotating cylindrical cam 10, with the result that roller 14a will move from projection 10a down to recess 10b to rest thereon, while first contacting element 14b will bring movable contact c1 of first switch S1 into contact with the terminal b1. Likewise, since movable contact C2 of switch S2 has been brought into contact with terminal b2 in the film winding completed condition, the motor will be braked, thereby causing roller 14a to make a sudden stop in the position B' (FIG. 4).

At the same time, however, second contacting element 14c will, under the action of the spring 13, urge flange portion 45 of release manipulating shaft 15 to the left, and thus release controlling shaft 15 will be removed leftwardly aganst the action of spring 21, so that plate cam 46 will urge lower end 22a of cooperative lever 22 to the left. This movement will rotate, via spring 23, release lever 24 in a clockwise direction, thus urging upwardly rod 25 engaging the other arm 24a of lever 24 to thereby release the shutter within the camera.

Lever 16 will rotate in a counterclockwise direction by virtue of a signal representing the completion of the travel of the rear curtain, and then second switching lever 17 will rotate in a clockwise direction, such that movable contact c2 of second switch S2 will contact terminal a2. In this manner, switch S3 is kept in contact with terminal b3 with the release button being released, such that motor 1 will again be driven by virtue of the signal representing the completion of the travel of the rear curtain. This causes cylindrical cam 10 to rotate and then projection 10c will rotate from the position shown in a broken line so as to engage tip 46a of plate cam 46, thus rotating release controlling shaft 15 in a clockwise direction against the action of spring 21, because the shaft 15 is rigidly journaled in plate cam 46.

At the same time, flange portion 45 will be rotated in a clockwise direction so that second contacting element 14c will fit in the groove 45a of flange portion 45. This causes release controlling shaft 15 to return to the right to the position shown in FIG. 1 under the action of spring 21. This in turn causes rod 25 to return to its normal position. When cylindrical cam 10 rotates until roller 14a comes in the position B shown in FIG. 4, the rotation of motor 1 will effect the winding of the film as described earlier, since the load on the winding side is smaller than that which has been applied on the cam surface beforehand.

As has been stated earlier, when the winding operation has been completed, then roller 14a will ride on projection 10a of cylindrical cam 10 and then abruptly stop in the position A. In this manner, the same operating cycles are repeated.

The operations of the motor driven photographic camera of the present invention being such as has been described thus far, arm 18b of detecting lever 18 is maintained within the travel path of release lever 15 during the period from the completion of the travel of the rear curtain until immediately prior to the completion of the winding of the film. Arm 18b is maintained retracted from the travel path of release controlling shaft 15 during the period from the completion of the winding of the film until immediately prior to the completion of the travel of the rear curtain. This permits the normal release operation after the completion of the winding of the film.

In contrast thereto, when all frames of the film have been used for photographing and the film undergoes tension, in other words, when the film to be fed has been used up in the course of winding, then there will result a greater load on the winding side, thus stopping the winding side, while cylindrical cam 10 side will rotate by overcoming the load which has been applied beforehand to cam 10, such that roller 14a will ride on projection 10a of the cam surface. At this time, when the release operation proceeds in the course of the winding, then arm 18b of detecting lever 18 will fall in the operational range of release controlling shaft 15 and second contacting element 14c will urge release controlling shaft 15 to the left, such that detecting lever 18 will rotate second switching lever 17 in a counterclockwise direction with the aid of the projection 17c to bring movable contact c2 into contact with terminal b2. Also, when cylindrical cam 10 further rotates, then roller 14a will engage recess 10b. This causes movable contact c1 to switch to terminal b1, such that the control circuit of motor 1 will be completed, thereby stopping motor 1 automatically.

Meanwhile, when release controlling shaft 15 moves to the left, lever 22 will rotate in a clockwise direction. However, it should be noted that the winding of the shutter does not represent the completion of the winding of the film, such that rod 25 will not be raised upwardly, nor will the shutter be released. Thus, release lever 24 will not rotate in a clockwise direction, and then spring 23 will not be maintained tensioned, i.e., in an energy-stored condition.

As has been described thus far, the detecting lever is maintained in the operational range of the release controlling shaft during the period from the commencement of the winding of the film until immediately before the completion of the winding, whereas it is maintained retracted from the operational path of the release controlling shaft after the completion of the winding, such that the normal shutter release is possible upon completion of the normal one-frame winding. Furthermore, when the film being fed is used up in the course of the winding, the shutter will not be released, while stopping the winding of the film automatically.

With respect to FIGS. 9 through 15, the construction of the second embodiment is substantially the same as that of the first embodiment in that in the case of either one-frame or continuous photographing, the film winding is accomplished in the normal condition and furthermore the cocking and release of the shutter are conducted alternately. The difference between the two embodiments is that in the second embodiment, upon completion of the feeding of the entire film in the course of one-frame winding of the film, the film winding is so designed as to stop automatically, whereas the rewinding of the film is effected automatically.

Figure 9:
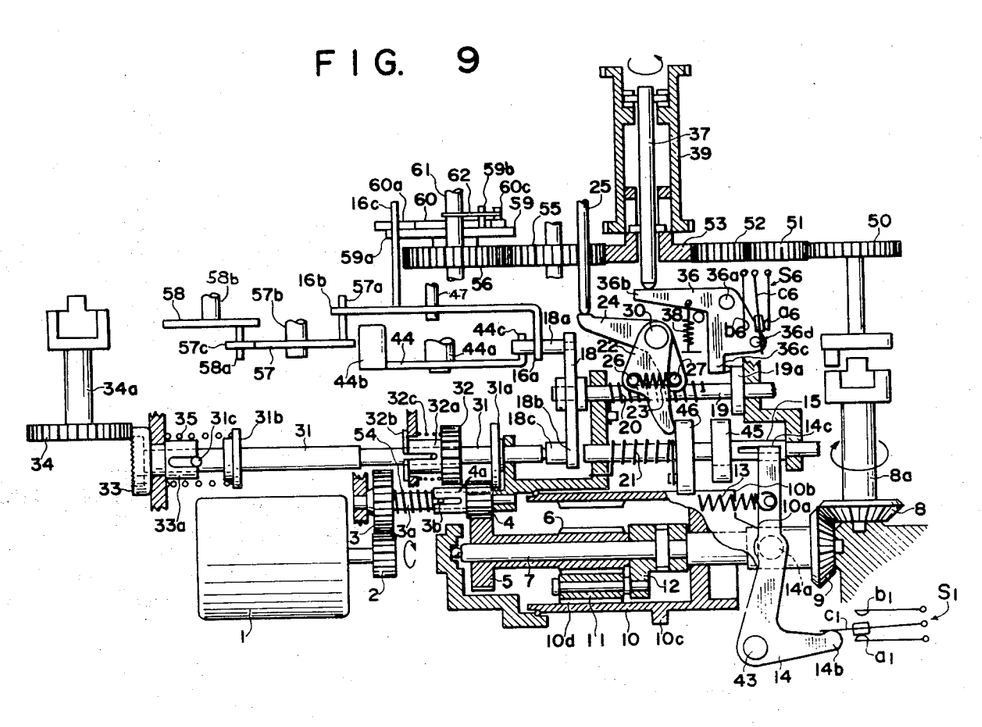
FIG. 9 is a cross-sectional view, partly in side elevation, of the essential parts of the second embodiment of the invention, shown at the time of completion of both film winding and shutter cocking operations.

Accordingly, like numerals represent parts which are the same parts shown in the first embodiment or which are similar in function to those shown therein. Although the transmission mechanism such as gear 2, gear 3, gear 4 and gear 5, which transmit the drive of motor 1, are similar to that shown in the first embodiment, gear 4 and sleeve 4a integral therewith are loosely journaled on a shaft 3a on which is rigidly mounted gear 3. The rotation of shaft 3a is transmitted to gear 4 by means of the engagement of projection 3b on shaft 3a with the groove in sleeve 4a. Spring 54 is interposed between gear 3 and sleeve 4a to urge gear 4, movable with respect to shaft 3a, to a position as shown in FIG. 9. Furthermore, sun gear 6 is rigidly mounted on shaft 7, while the constructions of gear 9 meshing with bevel gear 8 on the winding side, epicyclic gear 11 and cylindrical cam 10 are the same as those of the first embodiment.

Figure 12:
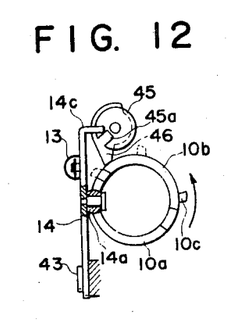
FIG. 12 is a plan view of essential parts of the second embodiment of the invention.

Two shafts 15 and 19 extending in parallel with shaft 7 are journaled in the camera body, the shaft 15 serving as a release controlling shaft and being rotatable and slidable relative to the bearing portion of the camera body. Furthermore, shaft 15 has rigidly mounted thereon flange 45 having notch 45a and plate cam 46, while the normal sliding positions and the rotating positions of flange 45 and plate cam 46 are controlled by means of coil spring 21 anchored at its both ends to plate cam 46 and the camera body, respectively. In this position, plate cam 46 is engageable with projection 10c on cylindrical cam 10, as shown in FIG. 12.

First switching lever 14 is rotatingly journaled inside the camera on shaft 43 and tends to rotate in a counterclockwise direction by means of spring 13. One end of lever 14 faces flange 45 and is further equipped with means such as second contacting element 14c which fits in notch 45a, roller 14a for contacting or engaging projection 10a and recess 10b of cylindrical cam 10d, and first contacting element 14b for operating movable contact c1 of first switch S1 provided for the motor circuit (see FIG. 15). First contacting element 14b is on the other arm of lever 14.

Lever 22 normally engages plate cam 46 and is journaled on shaft 30 in a rotatable fashion relative to the camera body. Rotatingly and coaxially journaled on shaft 30 is release lever 24 which engages release rod 25 of the shutter mechanism, while lever 22 and release lever 24 are connected to spring 23 via pins 26 and 27, respectively. Shaft 19 is slidingly and rotatingly journaled in the camera body, being biased by coil spring 20 to assume the position as shown in FIG. 9 and rigidly mounting thereon at its one end flange 19a, and detecting lever 18 at the other end thereof. Detecting lever 18 is provided with pin 18a at its one end and engages bent portion 16a of lever 16 which is rigidly journaled on a shaft 47 rotatable in conjunction with the rear curtain of the shutter. Lever 18 engages bent portion 44c of lever 44 mounted on shaft 44a and which is provided with an arm 44b engageable with the rear cover of the camera (not shown).

Figure 11:
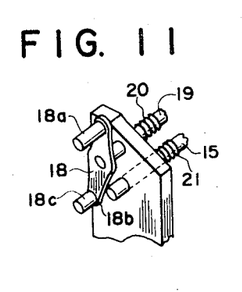
FIG. 11 is a partial perspective view showing the relationship between the detecting member and the release controlling member of the second embodiment.

Pin 18c at the other end 18b of detecting lever 18 is engageable with release controlling shaft 15, depending on the rotation of detecting lever 18 as shown in FIG. 11. Additionally, pin 18c assumes a disengaged position as shown in FIG. 9 where it is positioned between release shaft 15 and rewinding shaft 31. Crown gear 33 meshes with gear 34, rigidly mounted on shaft 34a engageable with the film spool on the film feeding side, and is journaled rotatingly in the camera body and equipped with cylindrical shaft 33a having a groove. Rewinding shaft 31 transmits rotative movement by means of pin 31a and is journaled in the camera body so as to be rotated by means of pin 18c in a manner so that it faces release shaft 15 while being limited in its leftward movement by means of flange 31a which engages the side face of gear 4 that is mounted on shaft 3a. Cylindrical shaft 32a is rotatably mounted on rewinding shaft 31, which further tends to maintain a given position within the camera body with the aid of flange 32b and spring 32c. In addition, gear 32 is rotatably mounted on shaft 31 and is driven by means of engagement of the pin on rewinding shaft 31 with the groove in cylindrical shaft 32a. Rewinding shaft 31 tends to slidingly move to the right by means of spring 35 interposed between flange 31b and the camera body.

Figure 13:
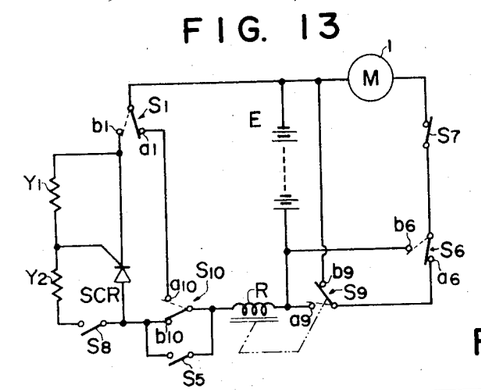
FIG. 13 shows a motor drive circuit set up in accordance with the elements as positioned in FIG. 1.

Shaft 8a is rotated by bevel gear 8 and is responsible for the film winding operation. Gear 8 meshes via gears 51 and 52 which a clutch gear which controls the engagement with sprocket 39. Clutch gear 53 has clutch shaft 37 which is rotated thereby and movable axially and which controls the engagement with the sprocket. One end of clutch shaft 37 engages one end 36b of third switching lever 36 rotatingly journaled on shaft 36a mounted within the camera body. The other end 36c of switching lever 36 is engageable with flange 19a. Pin 36d engages movable contact c6 for actuating switch S6 in the motor circuit as shown in FIG. 13.

Figure 10A:
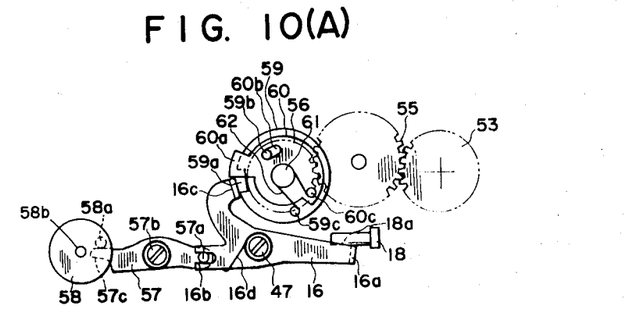
FIG. 10A shows the condition immediately prior to the completion of film winding.
Figure 10B:
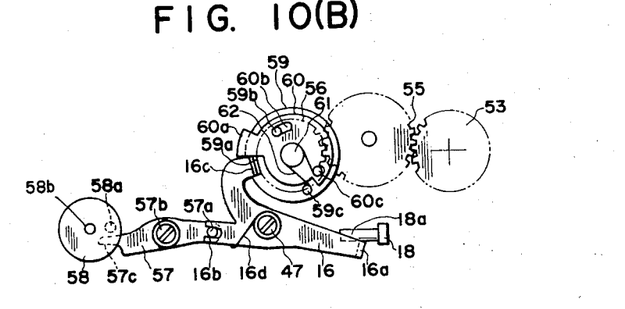
FIG. 10B shows the condition at the completion of film winding.
Figure 10C:
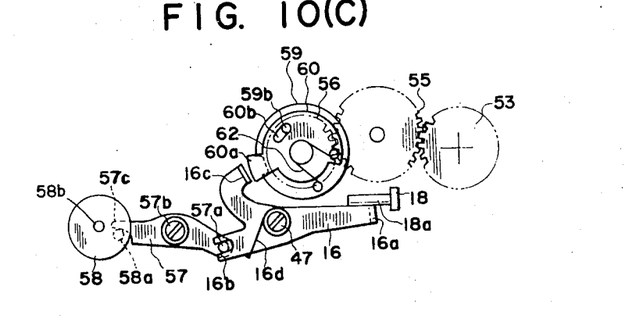
FIG. 10C shows the condition at the completion of exposure.

FIGS. 10A – 10C illustrate the mechanism wherein, by means of the camera mechanism, detecting lever 18 is maintained in the travel path of release controlling shaft 15 during the period from the commencement of the winding of one-frame of the film until the completion thereof, thus enabling engagement with shaft 15, while being retracted from the travel path of release controlling shaft 15 upon completion of the winding and then maintained in the retracted position until the exposure by the shutter has been completed.

The rotation of winding shaft 8a is transmitted to winding stop gear 56 via gear 55 meshing with clutch gear 53. Shaft 61 driven by winding stop gear 56 has rigidly mounted thereon winding stop disc 59 and loosely mounts thereon a disc 60 having a diameter smaller than that of winding stop disc 59. Between discs 59 and 60 is pin 59b for limiting the relative rotational angle of both discs. Winding stop disc 59 has notch 59a which engages upstanding piece 16c of lever 16, while the disc 60 is formed with projection 60a to normally cover notch 59a by means of spring 62. Lever 16 is so constructed that upstanding piece 16c slidingly contacts the peripheral edge of winding stop disc 59 by means of the action of small spring 16d (FIGS. 10A – 10C), while the second arm thereof is formed with bifurcated portion 16b.

Pin 57a, provided at one end of lever 57 rotatable about shaft 57b, engages bifurcated portion 16b, while pawl 57c is in a position permitting its engagement with pin 58a provided on lever 58 mounted to the winding shaft 58b for the rear curtain of the shutter.

During the winding of the film and the cocking of the shutter, upstanding projection 16c of lever 16 is maintained in sliding contact with the peripheral edge of winding stop disc 59. However, when winding one frame of the film is close to being completed, projection 60a abuts upstanding projection 16c to thereby urge it, against the action of spring 62 as gear 56 rotates, to fit in notch 59a as shown in FIG. 10B, thereby stopping the rotation of disc 60. At this time, lever 16 will rotate under the action of spring 16d in a clockwise direction, while bent projection 16a will be retracted from engagement with pin 18a of detecting lever 18. Thereby, detecting lever 18 will rotate under the action of spring 19 in a clockwise direction as shown in FIG. 11, causing the other arm 18b thereof to be retracted from the travel path of release controlling shaft 15.

When the shutter is released during the release controlling operation, rear curtain winding shaft 58b will rotate in a counterclockwise direction from the position shown in FIG. 10B. Upon completion of exposure, pin 58a will engage pawl 57c of lever 57 to thereby rotate it in a clockwise direction, while causing lever 16 to rotate against the action of spring 16d in a counterclockwise direction as shown in FIG. 10C. This then causes bent projection 16a to engage pin 18a to bring detecting lever 18 in the travel path of release controlling shaft 15, whereupon projection 60a is disengaged from upstanding projection 16c. Disc 60 will then rotate under the action of spring 62 in a counterclockwise direction to thereby cover notch 59a with the projection 60a. Then, upon completion of the winding of one-frame of the film, the shutter will be cocked, such that pawl 57c is released from engagement with pin 58a. Thus, even though lever 16 is about to rotate under the action of spring 16d in a clockwise direction, upstanding projection 16c will be restricted from rotation by means of projection 60a at the time of commencement of winding and thereafter by means of the peripheral edge of disc 59. As a result, detecting lever 18 will be maintained in a position within the travel path of release controlling lever 15, thereby engaging with it.

Figure 15:
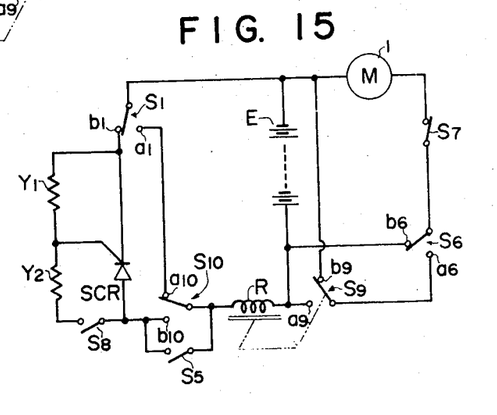
FIG. 15 shows a motor drive circuit during film rewinding operation.

The motor circuit consists, as shown in FIGS. 13 and 15, of a drive circuit which comprises power source E, motor 1, switch S7 and terminal b6 of switch S6, and a braking circuit for th motor, when switch S6 is on terminal a6 and relay switch S9 is on terminal b9. Switch S7 is normally open and closes when the film is fed between the film winding shaft and the rewinding shaft, and opened again upon completion of the film rewinding. Power source E is equipped with a control circuit parallel to the above motor circuit. Relay coil R is coupled at its one end to the positive pole of the power source and connects relay switch S9 to terminal a9 when excited, thereby closing the drive circuit while switching the contact of relay switch S9 to terminal b9 when not excited, thereby closing the braking circuit.

Connected to the other terminal of relay coil R are switches S10, S5 connected in parallel to each other. Switch S10 is designed so as to effect switching operation in conjunction with a release button (not shown), while being normally connected to terminal b10 and silicon control regulating element SCR. Switch S10 is connected to terminal a10 when the release button is depressed. Switch S5 switches between one-frame photographing and continuous photographing and is open when the camera is set for one-frame photographing and is closed when the camera is set for continuous photographing.

Terminal b10 of switch S10 and the other terminal of the switch S5 are connected with switch S8 and control regulating element SCR. The cathode of semiconductor control regulating element SCR is connected to terminal b1 of first switch S1 which has terminal a1 connected to the short-circuiting terminal a10. The other terminal of switch S8 is connected via series resistors Y1, Y2 to terminal b1. The junction or resistors Y1, Y2 is connected to the gate of semi-conductor control regulating element SCR. Switch S8 tends to be normally opened, while it is closed by the closing action of the shutter.

As is apparent from the foregoing description, when the film is being wound, switch S7 is closed, and roller 14a of first switching lever 14 is in recess 10b as shown in FIG. 3, while switch S10 is connected to terminal b10 so that electric current will flow through semiconductor control regulating element SCR into relay coil R, thus connecting relay switch S9 to terminal a9, thereby resulting in closed drive circuit and rotation of motor 1.

It is noted that the load applied to the film winding system is so designed as to be smaller than that applied to the cam by means of spring 13, such that the rotation of the motor 1 is transmitted by shaft 7 via gears 2, 3, 4 and 5, sun gear 6 ane epicyclic gear 11, with the aid of bracket 12, and in turn is transmitted through bevel gears 8, 9 to film winding shaft 8a which then rotates gears 50, 51 and 52 on the camera side. This causes clutch shaft 36 of clutch gear 53 to rotate sprocket 39, thus effecting the winding of the film and the cocking of the shutter.

When one frame of the film has been wound, the loading of the film winding system becomes greater due to the operations of the film winding mechanism or the like. As a result, the rotation of epicyclic gear 11 will be stopped, and the subsequent rotation thereof will cause cylinder 10 to rotate, thus upwardly urging roller 14a of first switching lever 14 onto projection 10a as shown in FIG. 4, then causing first switching lever 14 to rotate in a clockwise direction, with the result that first contacting piece 14b thereof will cause switch S1 to contact terminal a1. This leads to the interruption of the flow of electric current to relay coil R, thus switching switch S9 from terminal a9 to terminal b9 and disconnecting the drive circuit, so that the control circuit for short-circuiting motor 1 will be completed with the esult of the stoppage of motor 1.

The completion of the shutter cocking will rotate lever 16 and in turn detecting lever 18, thereby causing pin 18b to be retracted from the path of the leftward movement of release shaft 15, thus presenting the conditions as shown in FIGS. 10 and 13.

Subsequently, when the release button is depressed, the movable contact of switch S10 will be changed over to terminal a10, thus causing electric circuit to flow through first switch S1, i.e., from terminal a10 to relay coil R, whereupon relay switch S9 is switched to terminal a9 to thereby complete the motor drive circuit. This causes cylinder 10 to rotate, so that roller 14a on the projection 10a of the cam will fall by means of the spring 13 into recess 10b to take the position as shown in FIG. 4. As a result, first switching lever 14 will rotate in a counterclockwise direction and thus second contacting element 14c will urge flange 15a to the left, while release controlling shaft 15 will move to the left against the action of spring 21, thereby causing plate cam 46 to move lever 22. This further causes release lever 24 to rotate in a clockwise direction by means of spring 23, thus urging release rod 25 upwardly to release the shutter.

Simultaneously therewith, first contacting element 14b causes first switch S1 to switch to terminal b1, thus depressing the release button while de-actuating relay coil R, since the switch S10 is on terminal a10. This in turn causes relay switch S9 to contact with terminal b9, thus opening the drive circuit for motor 1, while closing the control circuits, such that motor 1 will be stopped when roller 14a is in the position B' as shown in FIG. 4.

When the expousre has been completed, switch S8 is closed by the action thereof, and switch s10 is switched to terminal b10 by the stopped depression of the release button, then the voltage at the junction of resistors Y1, Y2 is impressed on the gate of semi-conductor control regulating element SCR, thus exciting relay coil R again, while connecting relay switch S0 to terminal a9, thereby completing the motor drive circuit again. As a result, cylinder 10 will rotate, whereupon projection 10c will rotate from the position shown by the dotted line in FIG. 3 into engagement with plate cam 46, thus rotating release controlling shaft 15 in a clockwise direction against the action of spring 21. Meanwhile, the cocking of the shutter is initiated with the commencement of the film winding, and switch S8 will be opened with semi-conductor control regulating element SCR in a conductive condition, as long as both switches S1 and S10 are respectively at terminals b1, b10. Relay coil R is also maintained in the excited condition, thus continuing the actuation of the motor drive circuit. However, the motor circuit will not be actuated when either one of switches S1 or S10 is on respective terminals a1 or a10.

Subsequently, when the camera has been switched over to continuous photographing, switch S5 is closed. When first switch S1 is on terminal b1 regardless of whether switch S10 is on terminal a10 or on terminal b10, the relay coil is excited so long as semi-conductor control regulating element SCR is maintained in the conductive condition. However, when first switch S1 is on terminal a1, relay coil R is excited, provided that switch S10 is on terminal a10.

Accordingly, even at the completion of the film winding operation, if the release button is maintained depressed and switch S10 is on terminal a10, then relay coil R will be excited, after which the release operation will follow. Furthermore, at the time of completion of the releasing operation, the release button will continue to be depressed. Since first switch S1 is on terminal b1, even when switch S10 is on terminal a10 and because switch S8 is closed, switch S5 is maintained closed, semi-conductor control regulating element SCR is made conductive, thereby maintaining relay coil R excited, while permitting the continuation of the film winding operation.

Figure 14:
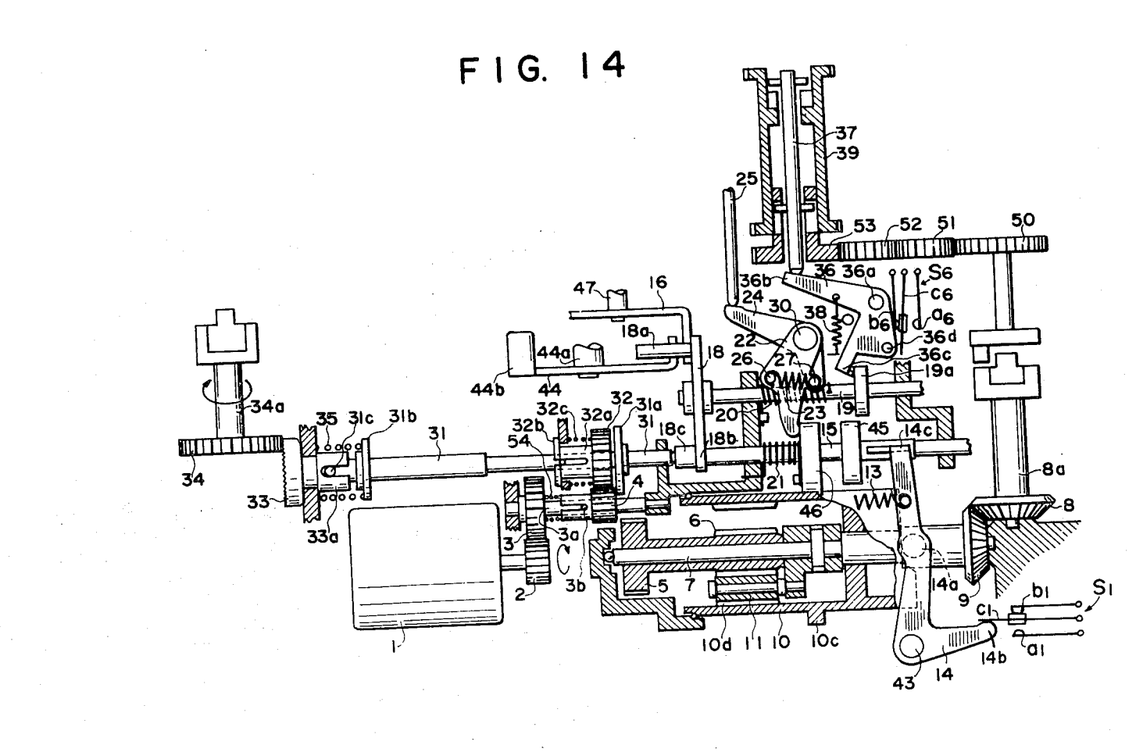
FIG. 14 is a cross-sectional view, partly in side elevation, of the essential parts of the second embodiment during the film rewinding operation.

In contrast thereto, when the photographing of the entire film frames has been completed and the film is still tensioned by the attempt to wind another frame of film, then the load being applied on the film winding side will become greater, and thus the winding side will be stopped in such condition, with the result that cylinder 10 will rotate to thereby cause roller 14a to be urged onto projection 10a of the cam. When cylinder 10 further rotates and hence roller 14a falls from projection 10a into recess 10b, then the release operation commences. However, at this time, edge portion 18b of detecting lever 18 is maintained in a position for ngagement with release controlling shaft 15 moving leftward, such that release controlling shaft 15 will move detecting lever 18 to the left, while pin 18c will move rewinding shaft 31 to the left against the action of spring 35. Accordingly, flange 31a will cause gear 4 to slide on shaft 3a to the left against the action of spring 54, thus causing gear 4 to mesh with gear 32 mounted on film rewinding shaft 31 as shown in FIG. 14.

At this time, shaft 19 will move to the left along with the leftward movement of detecting lever 18, while flange 19a will be brought into engagement with third switching lever 36 journaled on the shaft 36a, thus rotating lever 36 in a clockwise direction against the action of spring 38. Then, pin 36b will be retracted from movable contact c6 of switch S6, thus causing switch S6 to contact with terminal b6 as shown in FIG. 15, such that, regardless of whether the position of relay switch S9 is on terminal a9 or b9, the control circuit will be opened, while closing the drive circuit, thus resulting in the rotation of motor 1. At the same time, third switching lever 36 will move clutch shaft 37 of clutch gear 53 upwardly, thus interrupting the transmission of the rotation between gear 53 and speocket 39, while permitting the free rotation of sprocket 37.

The rotation of motor 1 is transmitted via gears 2, 3 and 4 to gear 32 to rotate the film rewinding shaft 31, such that pin 31a will rotate crown gear 33 by way of cylindrical shaft 33a. This will rotate gear 34 to rewind the film.

Upon completion of the film rewinding operation, switch S7 will be opened and the drive circuit will also be opened.

The opening of the rear cover of the camera to take out the film will cause lever 44 to rotate detecting lever 18 in a clockwise direction by means of pin 18a, such that detecting lever 18 will be retracted from the travel path of release controlling shaft 15. This in turn causes the disengagement of film rewinding shaft 31 from pin 18c, while film rewinding shaft 31 will be moved to the right under the action of spring 35, and accordingly gear 4 will be moved on shaft 3a to the right under the action of spring 54. This causes the disengagement of gear 4 from gear 32, while providing engagement with gear 5. As a result, opening of the rear cover of the camera will cause the winding condition as shown in FIG. 10A.

When the film is being rewound and thus release controlling shaft 15 moves to the left, plate cam 46 will rotate lever 22 in a clockwise direction. However, since the cocking of the shutter has not been completed, shutter release rod 25 cannot move upwardly, such that release lever 24 cannot rotate in a clockwise direction, thus maintaining spring 23 in the cocked condition.

As has been fully explained in the foregoing description of the present invention, there is provided a motor driven photographic camera wherein the winding of a film, the cocking of a shutter and the stopping of the film winding operation are alternately effected by means of the drive of an electric motor. The winding of the film, cocking of the shutter and stopping of the film and shutter release operation are alternately performed by means of a cam member which effects the transmission or the interruption of the rotation of the electric motor, depending on the magnitude of the load being applied to the film winding shaft at the time of winding the film. When the winding of the entire film has been completed, the release controlling shaft will be operated by means of the cam member, while in the course of winding one-frame of the film, the detecting member, which is engageable with the relase controlling shaft, will detect the operation thereof, thereby stopping the drive of the motor automatically, or otherwise effecting the rewinding of the film after stopping the film winding automatically.

It will be understood that the above description is merely illustrative of preferred embodiments of the invention. Additional modifications and improvements utilizing the discoveries of the present invention can be readily anticipated by those skilled in the art from the present disclosure and such modifications and improvements may fairly be presumed to be within the scope and purview of the invention as defined by the following claims.

What is claimed is:

1. A film winding control mechanism for a motor driven photographic camera comprising:
   means for winding said film and for cocking the camera shutter;
   a rotatable cam member;
   means for driving said means for winding and cocking with the load of said means for winding less than a predetermined value said means for driving also rotating said cam member when the driving of said means for winding and cocking is interrupted with said winding load exceeding said predetermined value;
   a motor for driving said means for driving;
   a switching member movable between first and second positions and moved by engagement with said cam member when rotated;
   a release controlling member movable between first and second positions and engageable with said switching member to move from said first position to said second position with said switching member in said second position and biased from engagement with said switching member with said switching member in said first position;
   detecting means movable between first and second positions and in engagement in said first position with said release controlling member in said second position thereof from the completion of exposure until the completion of winding, said means for detecting maintained in said second position in non-engagement with said release controlling member from the completion of winding until the completion of exposure; and
   first switching means for de-actuating said motor with said means for detecting in engagement with said release controlling member.

2. A film winding control mechanism as in claim 1 wherein said switching means includes second switching means for actuating said means for driving with said switching member in said second position, third switching means for de-actuating said means for driving in response to the completion of shutter release operation, and fourth switching means for restoring actuation of said means for driving upon completion of shutter release operation.

3. A film winding control mechanism for a motor driven photographic camera comprising:
   means for winding said film and for cocking the camera shutter;
   a rotatable cam member;
   means for driving said means for winding and cocking with the load of said means for winding less than a predetermined value, said means for driving also rotating said cam member when the driving of said means for winding and cocking is interrupted with said winding load exceeding said predetermined value;
   a motor for driving said means for driving;
   a switching member movable between first and second positions and moved by engagement with said cam member when rotated;
   a release controlling member movable between first and second position and engageable with said switching member to move from said first position to said second position with said switching member in said second position and biased from engagement with said switching member with said switching member in said first position;
   detecting means movable between first and second positions and in engagement in said first position with said release controlling member in said second position thereof from the completion of exposure until the completion of winding, said means for detecting maintained in said second position in non-engagement with said release controlling member from the completion of winding until the completion of exposure;
   means for rewinding said film; and
   a driving control means movable between a first position connecting said driving motor with said means for driving and a second position connecting said driving motor with said means for rewinding, said driving control means being normally positioned at said first position and moved to said second position with said detecting means in engagement with said release controlling member, whereby said driving control means in said second position switches said motor from driving said means for driving to driving said means for rewinding.

4. A film winding control mechanism as in claim 3 further comprising clutch means controlling said means for winding and wherein said means for detecting includes a second switching member for actuating said second clutch means to interrupt operation of said means for winding with said means for detecting in said first position with said release controlling member moving from said first position to said second position.

5. A film winding control mechanism as in claim 3 wherein said camera includes a removable rear cover and means engaging said rear cover and said means for detecting whereby said means for detecting is moved from said first position to said second position with said rear cover removed from the camera.

6. A film winding control mechanism as in claim 1 wherein said means for driving includes a motor circuit and means for shorting said motor circuit to de-actuate said means for driving, second switching means for actuating said means for shorting upon completion of an exposure and for de-actuating said means for shorting upon commencement of shutter cocking, and third switching means actuated with said release controlling member in said second position for actuating said motor circuit upon completion of the exposure.

7. A film winding control mechanism as in claim 1, wherein the movement of said release controlling member from said first position to said second position and the engagement thereof with said detecting means in said first position moves said detecting means to actuate said first switching means to de-actuate said motor.

8. A film winding control mechanism as in claim 1, wherein said release controlling member includes cam means mounted thereon, and said film winding control mechanism further comprises: means for releasing the shutter mechanism of the camera including a rod member movable only after completion of film winding, a first rotatable lever engageable with said cam means, a second lever mounted on said first rotatable lever, said second lever is biased to rotate with said first lever and engageable with said rod member, whereby said rod member is moved to release the camera shutter mechanism with movement of said release controlling member from said first to said second position, and said first lever is also rotatable against said bias as the rotation of said second lever is interrupted by said rod member to slow movement of said release controlling member.

9. A film winding control mechanism as in claim 1, further comprising:
an operating lever moved in one direction on completion of winding and moved in the opposite direction upon completion of exposure, said operating lever moves said detecting means to said second position thereof with movement of said operating lever in said first direction and moves said detecting means to said first position thereof with movement of said operating lever in said opposite direction.

10. A film winding control mechanism as in claim 3, wherein said detecting means is further shiftable by engagement with said release controlling member moving from said first position to said second position and said driving control means is moved from said first position to said second position in response to said shift of said detecting means.

11. A film winding control mechanism as in claim 3, wherein said driving control means comprises:
a first gear connected to said means for driving;
a second gear means connected to said means for rewinding;
an interconnecting gear driven by said motor and movable between a first position engaging with said first gear and a second position engaging with said second gear, said interconnecting gear is normally in said first position and is moved to said second position with said detecting means in engagement with said release controlling member, whereby said driving control means switches said motor from driving said means for driving to driving said means for rewinding with said interconnecting gear in said second position.

12. A film winding control mechanism as in claim 3, further comprising:
a winding stop gear connected to said means for winding said film;
a first winding stop disc including an aperture on its circumference and mounted to said winding stop gear;
a second winding stop disc rotatably mounted on said first winding stop disc and including a projection for covering said aperture and biased to cover said aperture with said projection;
a rotatable lever including an arm for engaging said detecting means and a cam follower riding on the periphery of said first winding stop disc, said rotatable lever is movable by the winding shaft of the rear shutter curtain;
whereby said first winding stop disc is rotated by said means for winding said film to cause said cam to displace said projection and to engage said aperture in said first winding stop disc and rotating said arm to move said detecting means from said first to said second position upon completion of film winding, said cam is retained in said aperture until completion of exposure; the rotation of said rear shutter curtain winding shaft rotating said rotatable lever to cause said cam follower to disengage from said aperture thereby rotating said arm to move said detecting means from said second to said first position upon completion of exposure, said cam follower is retained out of said aperture by said projection.

13. Film winding control mechanism as in claim 12, further comprising a movable shaft including a first cam mounted thereon and a second rotatable lever engaging said first cam and wherein said release controlling member includes a second cam mounted thereon, and said film winding control mechanism further comprises:
second gear means engaging said winding stop gear;

third gear means and a first clutch means connected to said means for winding said film;

second clutch means interconnecting said second and third gear means;

means for releasing the shutter mechanism of the camera and including a movable rod member, third and fourth rotatable levers, means for biasing said third rotatable lever to engage said second cam means, whereby said rod member is moved to release the camera shutter mechanism with movement of said release controlling member from said first to said second position;

a second movable rod member supporting said second clutch means and engaging said second rotatable lever, whereby said second clutch means disengages said second and third gear means with movement of said release controlling member from said first to said second position.

14. A film winding control mechanism as in claim 1, wherein said means for driving comprises a differential gear mechanism including:

a sun gear driven by said motor;

a first rotatable member arranged concentrically with said sun gear;

an epicyclic gear mounted on said first rotatable member so as to engage with said sun gear;

a second rotatable member arranged concentrically with said sun gear and having an inner faced gear engaged with said epicyclic gear; and said means for winding is connected with one of said first and second rotatable members, while said rotatable cam member is connected with the other of said first and second rotatable member.

* * * * *

UNITED STATES PATENT OFFICE
CERTIFICATE OF CORRECTION

Patent No. 3,820,140     Dated June 25, 1974

Inventor(s) Kaoru Umeda

It is certified that error appears in the above-identified patent and that said Letters Patent are hereby corrected as shown below:

Column 17: Line 58, cancel "slow" and insert --allow--.

Signed and sealed this 6th day of May 1975.

(SEAL)
Attest:

RUTH C. MASON
Attesting Officer

C. MARSHALL DANN
Commissioner of Patents
and Trademarks